US009350711B2

(12) United States Patent
Zhai et al.

(10) Patent No.: US 9,350,711 B2
(45) Date of Patent: May 24, 2016

(54) DATA TRANSMISSION METHOD, SYSTEM, AND APPARATUS

(71) Applicant: Huawei Technologies Co., Ltd., Shenzhen (CN)

(72) Inventors: Xianqi Zhai, Hangzhou (CN); Guoyao Hua, Shenzhen (CN); Aiping Chen, Hangzhou (CN); Yao Gui, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 14/336,146

(22) Filed: Jul. 21, 2014

(65) Prior Publication Data
US 2014/0337967 A1 Nov. 13, 2014

Related U.S. Application Data

(63) Continuation of application No. PCT/CN2012/075329, filed on May 11, 2012.

(51) Int. Cl.
*H04L 29/06* (2006.01)
(52) U.S. Cl.
CPC ........ *H04L 63/0272* (2013.01); *H04L 63/0428* (2013.01); *H04L 63/06* (2013.01); *H04L 63/061* (2013.01)
(58) Field of Classification Search
CPC .... G06F 13/00; H04L 63/061; H04L 63/0272
USPC .......................................................... 726/15
See application file for complete search history.

(56) References Cited

U.S. PATENT DOCUMENTS

| 7,509,491 B1* | 3/2009 | Wainner | H04L 9/0833 |
| | | | 713/163 |
| 8,726,007 B2* | 5/2014 | Chandrika | H04L 12/4633 |
| | | | 370/389 |

(Continued)

FOREIGN PATENT DOCUMENTS

| CN | 101002183 A | 7/2007 |
| CN | 101399665 A | 4/2009 |
| JP | 2003203023 A | 7/2003 |

OTHER PUBLICATIONS

Partial English Translation and Abstract of Japanese Patent Application No. JP2003203023A, Sep. 26, 2014, 57 pages.

(Continued)

*Primary Examiner* — Farid Homayounmehr
*Assistant Examiner* — Sanchit Sarker
(74) *Attorney, Agent, or Firm* — Conley Rose, P.C.; Grant Rodolph

(57) ABSTRACT

A data transmission method is applied in a virtual private network (VPN) and includes: querying, by an initiating client, a VPN server for external network Internet Protocol (IP) addresses of the initiating client and a responding client; performing, by the initiating client, key negotiation with the responding client through the VPN server; after the key negotiation is completed, writing, by the initiating client, the external network IP address of the initiating client into a source address field of a to-be-sent User Datagram Protocol (UDP) packet, writing the external network IP address of the responding client into a destination address field of the to-be-sent UDP packet, and encrypting the to-be-sent UDP packet according to a key obtained through the negotiation; and sending, by the initiating client, an encrypted UDP packet to the responding client, and performing packet interaction with the responding client directly.

8 Claims, 8 Drawing Sheets

(56) References Cited

U.S. PATENT DOCUMENTS

| | | | | |
|---|---|---|---|---|
| 2002/0093915 | A1* | 7/2002 | Larson | H04L 63/0272 370/235 |
| 2002/0150092 | A1 | 10/2002 | Bontempi et al. | |
| 2004/0205188 | A1* | 10/2004 | Ahlard | H04L 12/1854 709/224 |
| 2005/0135359 | A1* | 6/2005 | Chang | H04L 29/12009 370/389 |
| 2005/0195780 | A1* | 9/2005 | Haverinen | H04L 63/0272 370/338 |
| 2006/0143702 | A1* | 6/2006 | Hisada | H04L 12/4641 726/15 |
| 2007/0038853 | A1* | 2/2007 | Day | H04L 63/0281 713/153 |
| 2007/0058644 | A1* | 3/2007 | Brahmbhatt | H04L 29/12 370/401 |
| 2007/0150946 | A1* | 6/2007 | Hanberger | H04L 63/0272 726/15 |
| 2007/0157303 | A1* | 7/2007 | Pankratov | H04L 29/12528 726/11 |
| 2007/0255784 | A1 | 11/2007 | Takechi et al. | |
| 2008/0148379 | A1* | 6/2008 | Xu | H04L 29/125 726/11 |
| 2008/0199155 | A1* | 8/2008 | Hagens | H04N 7/141 386/291 |
| 2009/0328194 | A1* | 12/2009 | Kim | H04L 63/0272 726/15 |
| 2011/0296186 | A1 | 12/2011 | Wong et al. | |
| 2012/0233674 | A1* | 9/2012 | Gladstone | H04L 9/085 726/6 |
| 2013/0182712 | A1* | 7/2013 | Aguayo | H04L 12/4633 370/395.53 |
| 2013/0298182 | A1* | 11/2013 | May | H04L 63/0272 726/1 |
| 2014/0337967 | A1* | 11/2014 | Zhai | H04L 63/0272 726/15 |
| 2014/0362330 | A1* | 12/2014 | Tamagawa | G02B 5/3083 349/96 |

OTHER PUBLICATIONS

Foreign Communication From a Counterpart Application, PCT Application No. PCT/CN2012/075329, English Translation of International Search Report dated Feb. 7, 2013, 2 pages.
Foreign Communication From a Counterpart Application, PCT Application No. PCT/CN2012/075329, English Translation of Written Opinion dated Feb. 7, 2013, 6 pages.
Foreign Communication From a Counterpart Application, Chinese Application No. 201280000585.6, Chinese Office Action dated Jun. 24, 2015, 3 pages.
Foreign Communication From a Counterpart Application, Chinese Application No. 201280000585.6, Chinese Search Report dated Jun. 8, 2015, 2 pages.

* cited by examiner

US 9,350,711 B2

DATA TRANSMISSION METHOD, SYSTEM, AND APPARATUS

CROSS-REFERENCE TO RELATED APPLICATIONS

This application is a continuation of International Application No. PCT/CN2012/075329, filed on May 11, 2012, which is hereby incorporated by reference in its entirety.

TECHNICAL FIELD

The present invention relates to the field of computer and communications technologies, and in particular, to a data transmission method, an initiating client device, a virtual private network (VPN) server, a responding client device, and a data transmission system.

BACKGROUND

The user datagram protocol (UDP) is a connectionless transport layer protocol, provides a transaction-oriented, simple, and unreliable information transfer service, and is applicable to an application environment in which a small amount of data is transmitted once and a reliability requirement is not high.

End-to-end UDP communication is usually implemented through forwarding of a server. In a scenario of a VPN, a VPN client (hereinafter referred to as client) does not know an external network Internet Protocol (IP) address of a peer end client, and fills an internal network IP address of the peer end client into a destination address field of a to-be-sent UDP packet. A UDP packet sent by an initiating client to a responding client is first sent to a VPN server, and then the VPN server sends the UDP packet to the responding client; and similar forwarding processing is also performed when a UDP packet is returned by the responding client.

During implementation of the present invention, the inventor finds that the prior art has at least the following problems. Because all packets between two VPN clients need to be forwarded by a VPN server, when the number of clients or the number of packets to be transferred between the clients is relatively large in the same period of time, a processing load of the VPN server increases, thereby further increasing a packet loss rate and prolonging a packet transfer delay.

SUMMARY

An embodiment of the present invention provides a data transmission method, so as to solve a problem of a heavy processing load imposed on a VPN server during end-to-end communication between clients in an existing VPN scenario.

Accordingly, embodiments of the present invention further provide an initiating client device, a responding client device, a VPN server, and a data transmission system.

Technical solutions provided in the embodiments of the present invention are as follows:

A data transmission method is applied in a virtual private network (VPN) and includes: querying, by an initiating client, a VPN server for external network IP addresses of the initiating client and a responding client; performing, by the initiating client, key negotiation with the responding client through the VPN server; after the key negotiation is completed, writing, by the initiating client, the external network IP address of the initiating client into a source address field of a to-be-sent user datagram protocol UDP packet, writing the external network IP address of the responding client into a destination address field of the to-be-sent UDP packet, and encrypting the to-be-sent UDP packet according to a key obtained through the negotiation; and sending, by the initiating client, an encrypted UDP packet to the responding client, and performing packet interaction with the responding client directly.

A data transmission method is applied in a VPN and includes: providing, by a VPN server, queried external network IP addresses of an initiating client and a responding client for the initiating client according to a pre-stored external network IP address of each client; and in a process of key negotiation preformed between the initiating client and the responding client, forwarding a message, sent by the initiating client, to the responding client, and forwarding a message, returned by the responding client, to the initiating client.

A data transmission method is applied in a VPN and includes: performing, by a responding client, key negotiation with an initiating client through a VPN server; after the key negotiation is completed, extracting, by the responding client, external network IP addresses of the initiating client and the responding client from a received UDP packet sent by the initiating client; writing, by the responding client, the external network IP address of the responding client into a source address field of a to-be-sent UDP packet, writing the external network IP address of the initiating client into a destination address field of the to-be-sent UDP packet, and encrypting the to-be-sent UDP packet according to a key obtained through the negotiation; and sending, by the responding client, an encrypted UDP packet to the initiating client, and performing packet interaction with the initiating client directly.

An initiating client device includes: a querying unit configured to query a VPN server for external network IP addresses of the initiating client and a responding client; a first key negotiating unit configured to perform key negotiation with the responding client through the VPN server; and a first packet interacting unit configured to: after the key negotiation is completed, write the external network IP address of the initiating client into a source address field of a to-be-sent user datagram protocol UDP packet, write the external network IP address of the responding client into a destination address field of the to-be-sent user datagram protocol UDP packet, and encrypt the to-be-sent UDP packet according to a key obtained through the negotiation; and send an encrypted UDP packet to the responding client, and perform packet interaction with the responding client directly.

A VPN server includes: an address querying unit configured to provide queried external network IP addresses of an initiating client and a responding client for the initiating client according to a pre-stored external network IP address of each client; and a forwarding unit configured to: in a process of key negotiation preformed between the initiating client and the responding client, forward a message, sent by the initiating client, to the responding client, and forward a message, returned by the responding client, to the initiating client.

A responding client device includes: a second key negotiating unit configured to perform key negotiation with an initiating client through a VPN server; and a second packet interacting unit configured to: after the key negotiation is completed, extract external network IP addresses of the initiating client and the responding client from a received UDP packet sent by the initiating client, write the external network IP address of the responding client into a source address field of a to-be-sent UDP packet, write the external network IP address of the initiating client into a destination address field of the to-be-sent UDP packet, and encrypt the to-be-sent UDP packet according to a key obtained through the negotiation;

and send an encrypted UDP packet to the initiating client, and perform packet interaction with the initiating client directly.

A data transmission system is applied in a VPN and includes the initiating client device, the VPN server, and the responding client device described in the foregoing.

In the embodiments of the present invention, an initiating client first obtains external network IP addresses of the initiating client and a responding client by querying a VPN server, and then performs key negotiation with the responding client through the VPN server. The initiating client constructs a UDP packet according to the obtained external network IP addresses of the two communication parties, encrypts the UDP packet by using a key obtained through the negotiation, and sends an encrypted UDP packet to the responding client, so as to implement direct communication with the responding client. After the key negotiation is completed, a message between the initiating client and the responding client does not need to be forwarded by the VPN server, thereby lightening a processing load of the VPN server.

BRIEF DESCRIPTION OF DRAWINGS

To describe the technical solutions in the embodiments of the present invention or in the prior art more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

Because end-to-end UDP communication between clients needs to be implemented through forwarding of a server in an existing VPN scenario, a processing load of a VPN server is relatively heavy. An embodiment of the present invention provides a data transmission method, which provides a feasible solution for lightening a processing load of the VPN server during end-to-end communication between clients in the VPN scenario.

Main implementation principles, specific implementation manners, and achievable beneficial effects of the technical solutions in the embodiments of the present invention are described in detail in the following with reference to the accompanying drawings.

Embodiment 1

In this embodiment, a data transmission method provided in the embodiment of the present invention is described from a perspective of an initiating client.

Figure 1:
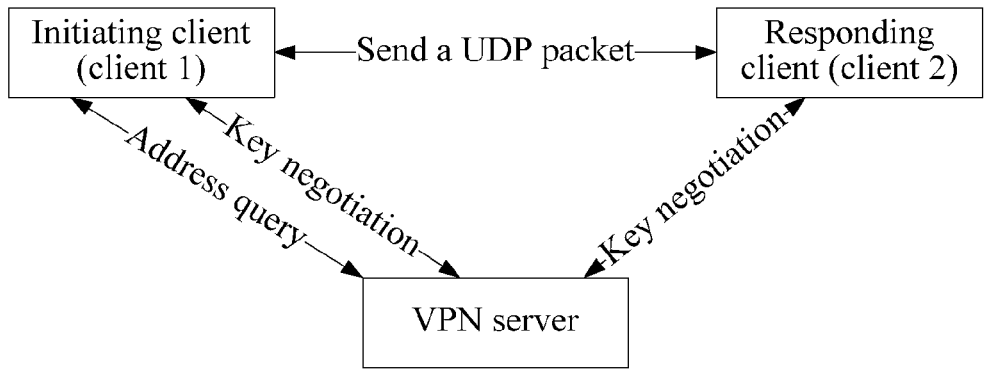
FIG. 1 is a schematic diagram of an application scenario and a message interaction process according to an embodiment of the present invention.

FIG. 1 is a schematic diagram of a VPN scenario applied in the embodiment of the present invention, including a client 1, a VPN server, and a client 2. It should be noted that, the same client may serve as an initiator in a communication process and serve as a responder in another communication process. In this embodiment, a data transmission solution is described by taking that the client 1 is an initiating client and the client 2 is a responding client as an example.

Figure 2:
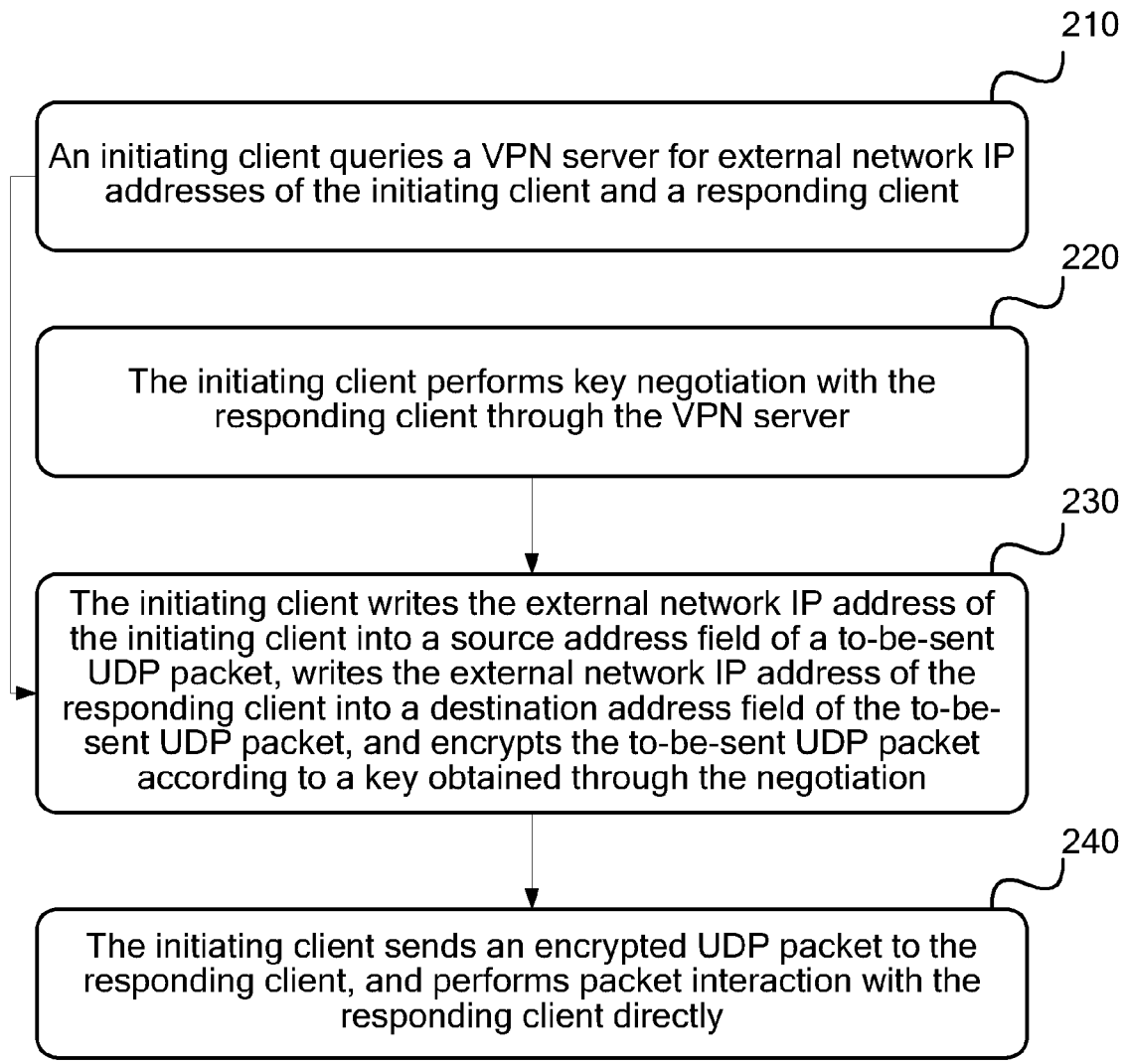
FIG. 2 is a flow chart of a data transmission method according to Embodiment 1 of the present invention.

As shown in FIG. 2, a procedure of the data transmission method provided in the embodiment of the present invention is as follows:

Step 210: An initiating client queries a VPN server for external network IP addresses of the initiating client and a responding client, where the external network IP addresses are unique in the Internet.

Figure 3:
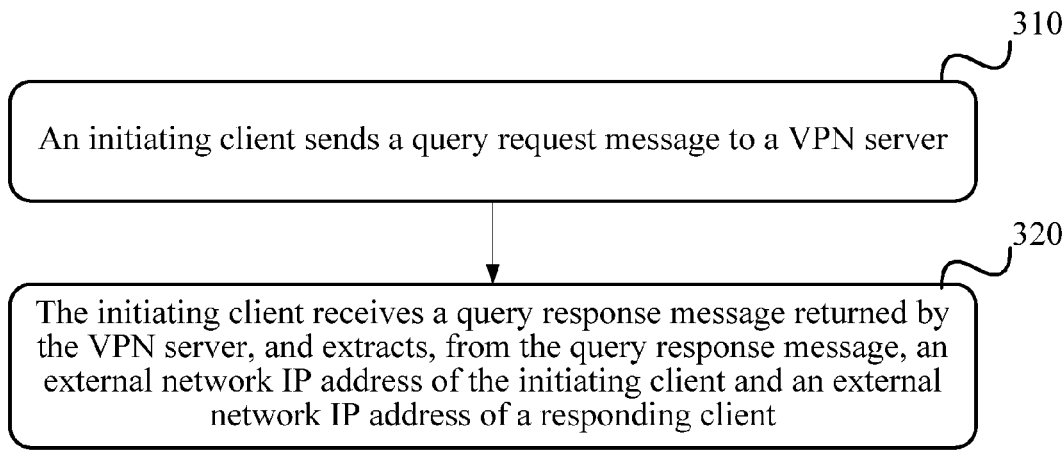
FIG. 3 is a schematic diagram of a process of querying an external network IP address in the data transmission method according to Embodiment 1 of the present invention.

Optionally, the initiating client may query the VPN server for corresponding external network IP addresses according to an identifier of the initiating client and an identifier of the responding client, where the identifier of the initiating client is allocated when the initiating client logs in to the VPN server and the identifier of the responding client is allocated when the responding client logs in to the VPN server. In a VPN scenario, when a client (which may be the initiating client and may also be the responding client) logs into the VPN server, the client carries its external network IP address in a login request message; after allocating an identifier to the client that logs in (which may be the initiating client and may also be the responding client) and notifying the client of an allocated identifier through a login response message, the VPN server establishes and stores a correspondence between the external network IP address of the client (which may be the initiating client and may also be the responding client) and the identifier of the client for subsequent query. When this query manner is used, a specific query procedure is as shown in FIG. 3.

Step 310: The initiating client sends a query request message to the VPN server, where the query request message carries an identifier of the initiating client and an identifier of the responding client.

The identifier of the initiating client may be extracted from a login response message that is returned by the VPN server when the initiating client logs in, and the identifier of the responding client may be obtained through query performed in advance by the initiating client for the VPN server according to a service requirement.

Step 320: The initiating client receives a query response message returned by the VPN server, and extracts, from the query response message, the external network IP address of the initiating client and the external network IP address of the responding client.

In addition, the initiating client may also first obtain an internal network IP address of the initiating client and an internal network IP address of the responding client (a specific obtaining manner is similar to an obtaining manner of the identifier of the initiating client and the identifier of the responding client in the foregoing), and then query the VPN server for corresponding external network IP addresses according to the internal network IP address of the initiating client and the internal network IP address of the responding client. The internal network IP address, that is, a virtual IP address, is an IP address that is allocated when a client logs in to the VPN server; and an internal network IP address of the client is unique in a VPN to which the client belongs, but virtual IP addresses may be repeated in different VPNs. In a VPN scenario, in order to forward a message, when a client logs in to a VPN server, the VPN server allocates an internal network IP address to the client and notifies the client of an allocated identifier through a login response message. The VPN server extracts a carried external network IP address from a login request message of the client, so as to establish and store a correspondence between an external network IP address and an internal network IP address of each client for subsequent query.

Step 220: The initiating client performs key negotiation with the responding client through the VPN server.

Optionally, when the key negotiation is performed, a negotiated key may be a symmetric key, for example, a key generated based on a symmetric key encryption (e.g. a Data Encryption Standard (DES)) algorithm, and may also be an asymmetric key, which is not limited herein.

Because all messages exchanged between the initiating client and the responding client are forwarded through the VPN server in a key negotiation process, security of the messages can be ensured, so that security of subsequent direct communication that is based on a key obtained in the key negotiation process and is performed between the initiating client and the receiving client can be also ensured.

Step 230: After the key negotiation is completed, the initiating client writes the external network IP address of the initiating client into a source address field of a to-be-sent UDP packet, writes the external network IP address of the responding client into a destination address field of the to-be-sent UDP packet, and encrypts the to-be-sent UDP packet according to a key obtained through the negotiation.

Optionally, if the key obtained through the key negotiation between the initiating client and the responding client is a symmetric key, the key used by the initiating client to encrypt the to-be-sent UDP packet in step 230 is the same as a key used to decrypt a received UDP packet subsequently.

If the key obtained through the key negotiation is an asymmetric key, the initiating client encrypts the to-be-sent UDP packet by using a public key of the responding client obtained through the negotiation in step 230, and decrypts a received UDP packet, returned by the responding client, by using a private key of the initiating client subsequently.

Step 240: The initiating client sends an encrypted UDP packet to the responding client, and performs packet interaction with the responding client directly.

Optionally, steps 230 and 240 may also be regarded as that the initiating client establishes a secure sockets layer (SSL) encrypted tunnel with the responding client according to the external network IP addresses of the initiating client and the responding client obtained through the query and the key obtained through the negotiation; sends a UDP packet to the responding client through the SSL encrypted tunnel, and receives a UDP packet returned by the responding client, so as to implement direct packet interaction between the initiating client and the responding client.

It should be noted that, in the embodiment of the present invention, execution order of the two steps: the key negotiation in step 220 and the external network address query in step 210, is not limited; and the key negotiation shown in step 220 may also be performed first, and then the external network address query shown in step 210 is performed, or the initiating client may also perform the two steps in parallel: the key negotiation and the external network address query.

Because a destination address in a UDP packet sent by the initiating client to the responding client is the external network IP address of the responding client, the UDP packet may be directly sent to the responding client and does not need to be forwarded by the VPN server, thereby lightening a processing load of the VPN server.

The embodiment of the present invention provides a data transmission method, where an initiating client first obtains external network IP addresses of the initiating client and a responding client by querying a VPN server, and then performs key negotiation with the responding client through the VPN server. The initiating client constructs a UDP packet according to the obtained external network IP addresses of the two communication parties, and encrypts the UDP packet by using a key obtained through the negotiation, and sends an encrypted UDP packet to the responding client. Subsequently, the responding client may send a UDP packet to the initiating client according to the key obtained during the key negotiation and the external network IP addresses of the two communication parties extracted from the UDP packet sent by the initiating client, so as to implement direct communication between the initiating client and the receiving client on the premise of ensuring communication packet security.

Because only a message in a key negotiation process between the initiating client and the responding client is forwarded through the VPN server in a data transmission process and after the key negotiation is completed, a message between the initiating client and the responding client does not need to be forwarded by the VPN server, a processing load of the VPN server is lightened, thereby preventing the VPN server from becoming a bottleneck of message transmission, reducing a risk of packet loss caused by depletion of a processing resource of the VPN server, and shortening a packet transfer delay.

Embodiment 2

In this embodiment of the present invention, a data transmission solution provided in the embodiment of the present invention is described from a perspective of a VPN server. An application scenario of the data transmission solution is as shown in FIG. 1.

Figure 4:
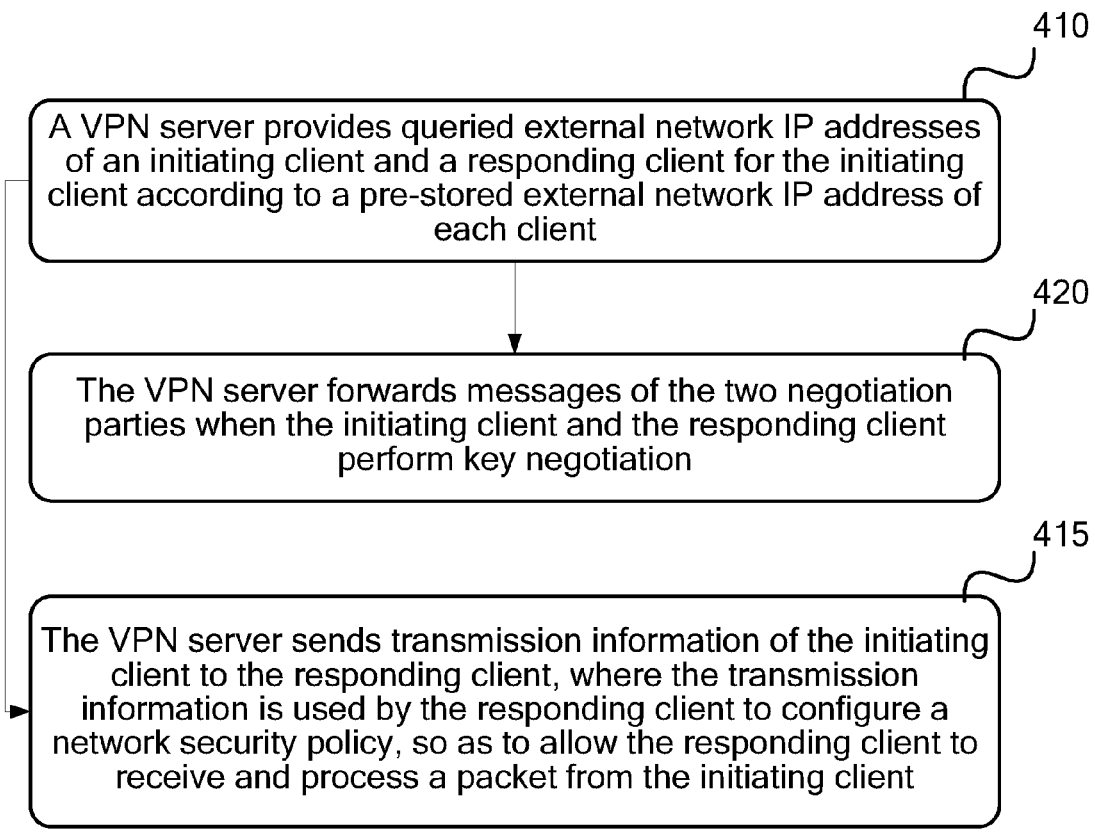
FIG. 4 is a flow chart of a data transmission method according to Embodiment 2 of the present invention.

FIG. 4 is a flow chart of a data transmission method according to the embodiment of the present invention.

Step 410: A VPN server provides queried external network IP addresses of an initiating client and a responding client for the initiating client according to a pre-stored external network IP address of each client.

Figure 5:
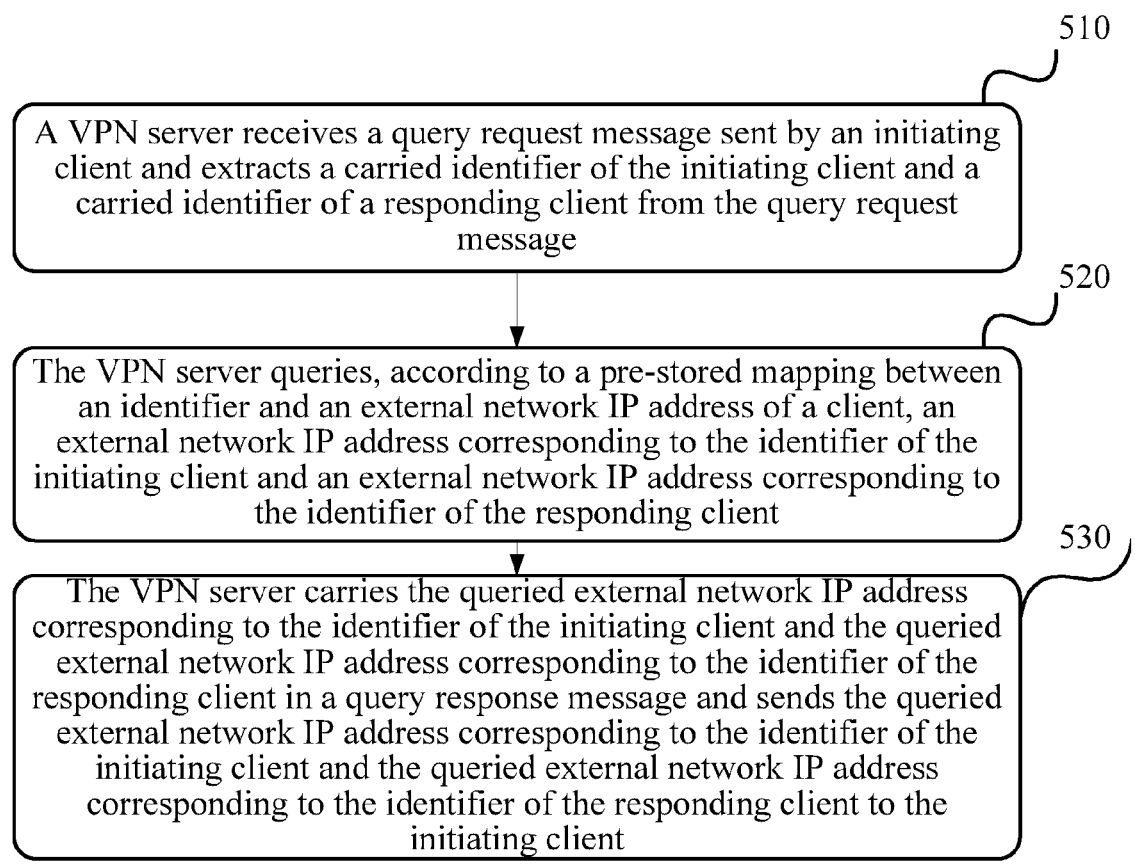
FIG. 5 is a schematic diagram of a process of querying an external network IP address in the data transmission method according to Embodiment 2 of the present invention.

Optionally, as shown in FIG. 5, a specific procedure that the VPN server provides the queried external network IP addresses of the initiating client and the responding client for the initiating client includes the following steps.

Step 510: The VPN server receives a query request message sent by the initiating client and extracts a carried identifier of the initiating client and a carried identifier of the responding client from the query request message.

Step 520: The VPN server queries, according to a pre-stored correspondence between an identifier and an external network IP address of a client, an external network IP address corresponding to the identifier of the initiating client and an external network IP address corresponding to the identifier of the responding client. For a manner of establishing the correspondence between the identifier and the external network IP address of the client, reference is made to Embodiment 1, which is not described herein again.

Step 530: The VPN server carries the queried external network IP address corresponding to the identifier of the initiating client and the queried external network IP address corresponding to the identifier of the responding client in a query response message and sends the query response message to the initiating client.

In addition, the VPN server may also provide the external network IP addresses of the initiating client and the responding client for the initiating client in another manner; for example, the VPN server queries, according to an internal network IP address of the initiating client and an internal network IP address of the responding client that are carried in a query request, a stored correspondence between an internal network IP address and an external network IP address of each client for the external network IP addresses of the initiating client and the responding client, and returns the external network IP addresses of the initiating client and the responding client to the initiating client. Other manners are no longer listed herein one by one.

Step 420: The VPN server forwards messages of the two negotiation parties when the initiating client and the responding client perform key negotiation, and specifically, forwards a message, sent by the initiating client, to the responding client and forwards a message, returned by the responding client, to the initiating client.

Optionally, some responding clients configured with a security device such as a firewall and having a high security requirement are not allowed to receive a packet sent by an untrusted network node other than the VPN server. To enable the initiating client and the responding client to successfully perform direct packet interaction, after the foregoing step 410, the following step is further included.

Step 415: The VPN server sends transmission information of the initiating client to the responding client, where the transmission information includes the external network IP address of the initiating client and the transmission information is used by the responding client to configure a network security policy, so as to allow the responding client to receive and process a packet from the initiating client.

Optionally, the transmission information further includes a protocol identifier used by the initiating client to send a packet, and the like. After receiving the transmission information notified by the VPN server, the responding client configures a network security policy of a firewall or another security device according to the external network IP of the initiating client carried in the transmission information, so that the responding client is allowed to receive and process a packet from the initiating client.

In the data transmission method provided in the embodiment of the present invention, a VPN server forwards messages sent by an initiating client and a responding client to each other in a key negotiation process between the initiating client and the responding client. After the negotiation is completed, the VPN server does not need to forward UDP packets that are sent by the initiating client and the responding client to each other, thereby lightening a processing load.

Embodiment 3

In this embodiment of the present invention, a data transmission solution provided in the embodiment of the present invention is described from a perspective of a responding client. An application scenario of the data transmission solution is as shown in FIG. 1.

Figure 6:
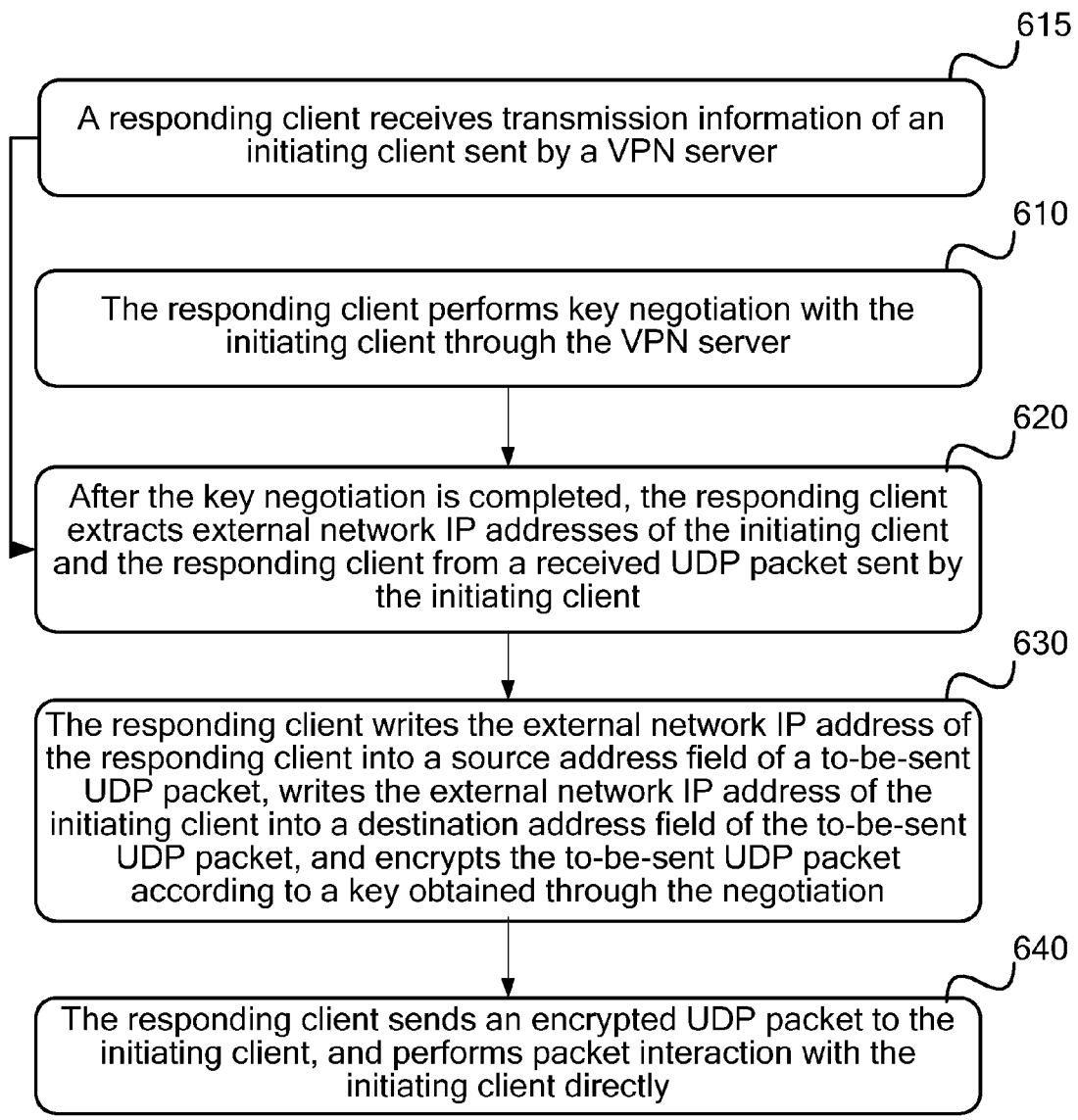
FIG. 6 is a flow chart of a data transmission method according to Embodiment 3 of the present invention.

FIG. 6 is a flow chart of a data transmission method according to the embodiment of the present invention.

Step 610: A responding client performs key negotiation with an initiating client through a VPN server.

Optionally, when the key negotiation is performed, a negotiated key may be a symmetric key, for example, a key generated based on a DES algorithm, and may also be an asymmetric key, which is not limited herein.

Step 620: After the key negotiation is completed, the responding client extracts external network IP addresses of the initiating client and the responding client from a received UDP packet sent by the initiating client.

After receiving the UDP packet sent by the initiating client, the responding client decrypts the UDP packet according to a key obtained through the key negotiation, extracts the external network IP address of the initiating client from a source address field of a packet header of an decrypted UDP packet and extracts the external network IP address of the responding client from a destination address field of the packet header.

Step 630: The responding client writes the external network IP address of the responding client into a source address field of a to-be-sent UDP packet, writes the external network IP address of the initiating client into a destination address field of the to-be-sent UDP packet, and encrypts the to-be-sent UDP packet according to the key obtained through the negotiation.

Optionally, if the key obtained through the key negotiation between the initiating client and the responding client is a symmetric key, the key used to decrypt the received UDP packet in step 620 is the same as a key used to encrypt the to-be-sent UDP packet.

If the key obtained through the key negotiation is an asymmetric key, the responding client decrypts the received UDP packet by using a private key of the responding client in step 620, and encrypts the to-be-sent UDP packet by using a public key of the initiating client obtained through the negotiation.

Step 640: The responding client sends an encrypted UDP packet to the initiating client, and performs packet interaction with the initiating client directly.

Optionally, if the responding client has a high security requirement, the responding client is not allowed by a policy in a security device such as a configured firewall to receive a packet sent by an untrusted network node. To enable the client to receive a packet sent by the initiating client and successfully perform packet interaction, before step 620, the following step is further included.

Step 615: The responding client receives transmission information of the initiating client sent by the VPN server, where the transmission information includes the external network IP address of the initiating client; and the responding client configures a network security policy according to the transmission information, so as to allow the responding client to receive and process a packet from the initiating client.

Embodiment 4

To facilitate understanding, a data transmission method provided in an embodiment of the present invention is described from a perspective of mutual interaction of devices such as an initiating client, a responding client, and a VPN server. A schematic diagram of the data transmission method is still as shown in FIG. 1.

Figure 7A:
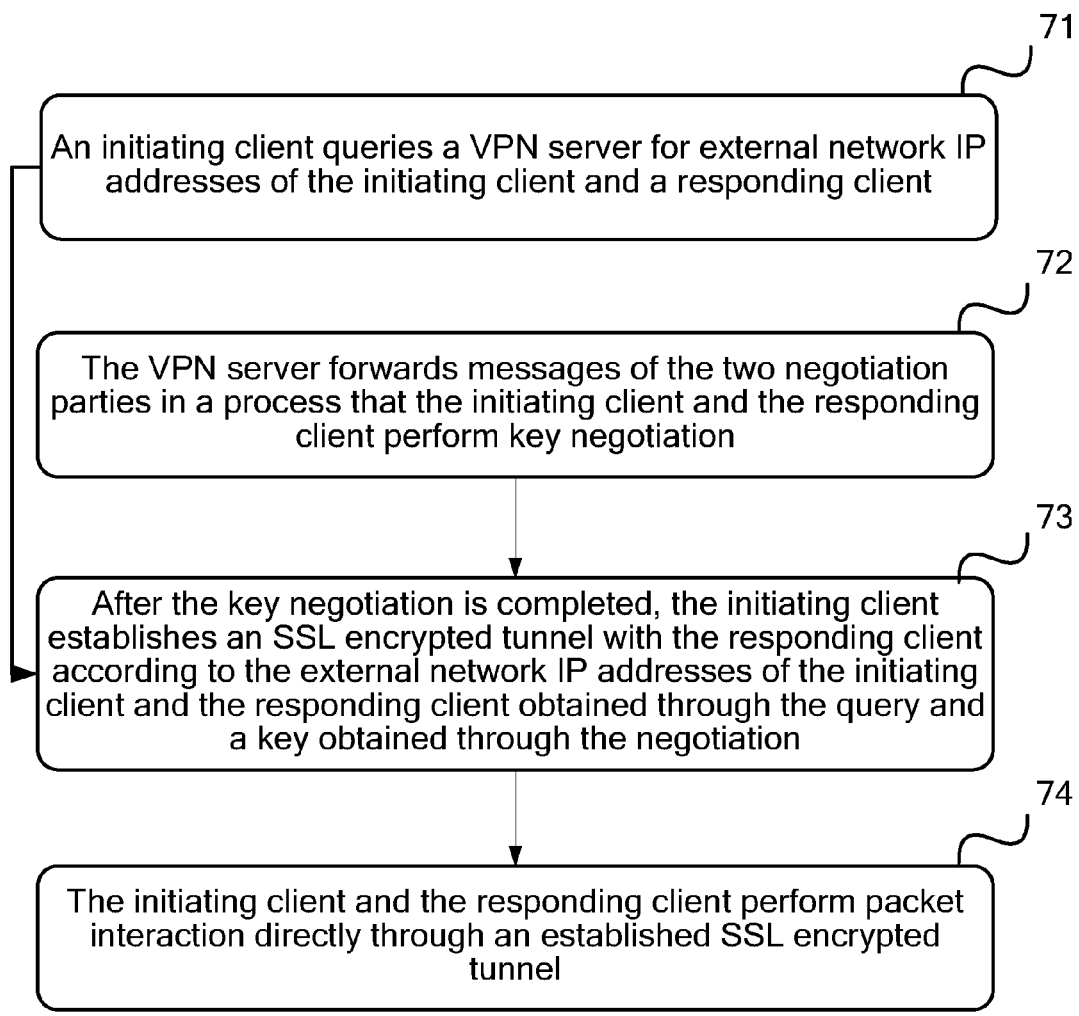
FIG. 7A is a flow chart of a data transmission method according to Embodiment 4 of the present invention.

FIG. 7A is a flow chart of a data transmission method according to the embodiment of the present invention, where the method includes the following steps.

Step 71: An initiating client queries a VPN server for external network IP addresses of the initiating client and a responding client, where the external network IP addresses are unique in the Internet.

For a specific query manner, reference is made to descriptions about FIG. 3 and FIG. 5, which is not repeated herein.

Step 72: The VPN server forwards messages of the two negotiating parties in a process that the initiating client and the responding client perform key negotiation.

Specifically, in a packet used for the key negotiation, a destination address filled by the initiating client is an internal network IP address of the responding client, and a source address is an internal network IP address of the initiating client, where the internal network IP address of the initiating client is allocated when the initiating client logs in to the VPN server, and the internal network IP address of the responding client is allocated when the responding client logs in to the VPN server. The initiating client may obtain the internal network IP address of the initiating client from a login response message that is returned by the VPN server when the initiating client logs in, and obtain the internal network IP address of the responding client by querying the VPN server in advance.

The VPN server forwards a received packet that is sent by the initiating client and used for the key negotiation with the responding client to the responding client.

The responding client obtains the internal network IP address of the initiating client from the packet sent by the VPN server, and correspondingly constructs a packet that is to be returned to the initiating client, where a destination address filled in the packet is the internal network IP address of the initiating client and a source address is the internal network IP address of the responding client.

The VPN server forwards a received packet that is returned by the responding client and used for the key negotiation with the initiating client to the initiating client.

Step 73: After the key negotiation is completed, the initiating client establishes an SSL encrypted tunnel with the responding client according to the external network IP addresses of the initiating client and the responding client obtained through the query and the key obtained through the negotiation.

Step 74: The initiating client and the responding client perform packet interaction directly through an established SSL encrypted tunnel.

It should be noted that, execution order of step 71 and step 72 is not limited in this embodiment, and the execution order may be reversed or step 71 and step 72 may be performed in parallel.

In the data transmission method provided in the embodiment of the present invention, in one aspect, an initiating client obtains external network IP addresses of the initiating client and a responding client by querying a VPN server, and in another aspect, performs key negotiation with the responding client through the VPN server. Because all messages exchanged between the initiating client and the responding client are forwarded through the VPN server in a key negotiation process, security of the messages can be ensured, so that security of subsequent direct communication that is based on a key obtained in the key negotiation process can be also ensured. After the key negotiation is completed, the initiating client and the responding client can perform direct communication based on the external network IP addresses and the key obtained through the negotiation, and at this time, a message between the initiating client and the responding client does not need to be forwarded by the VPN server, so that a processing load of the VPN server is lightened, thereby preventing the VPN server from becoming a bottleneck of message transmission, reducing a risk of packet loss caused by depletion of a processing resource of the VPN server, and shortening a packet transfer delay.

Embodiment 5

An embodiment of the present invention provides a specific example of a data transmission process, where the data transmission method provided in the embodiment of the present invention is described in a manner of a sequence diagram.

Figure 7B:
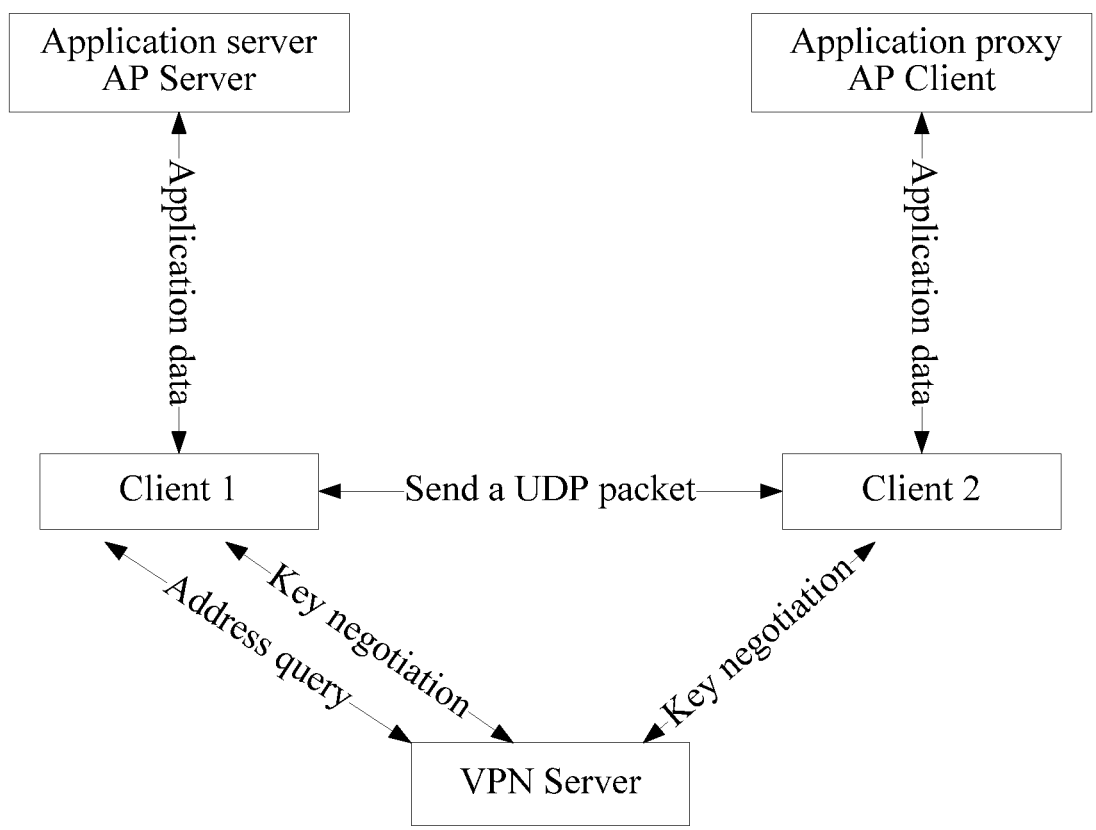
FIG. 7B is a schematic diagram of an application scenario of a data transmission process according to Embodiment 5 of the present invention.

FIG. 7B is a schematic diagram of an application scenario according to the embodiment of the present invention, where a client 1 is an initiating client and a client 2 is a responding client is taken as an example. The client 1 is connected to an application server and the client 2 is connected to an application proxy, where a specific application may be an application that has a low requirement for real-time quality, such as an IP call and instant messaging.

Figure 7C:
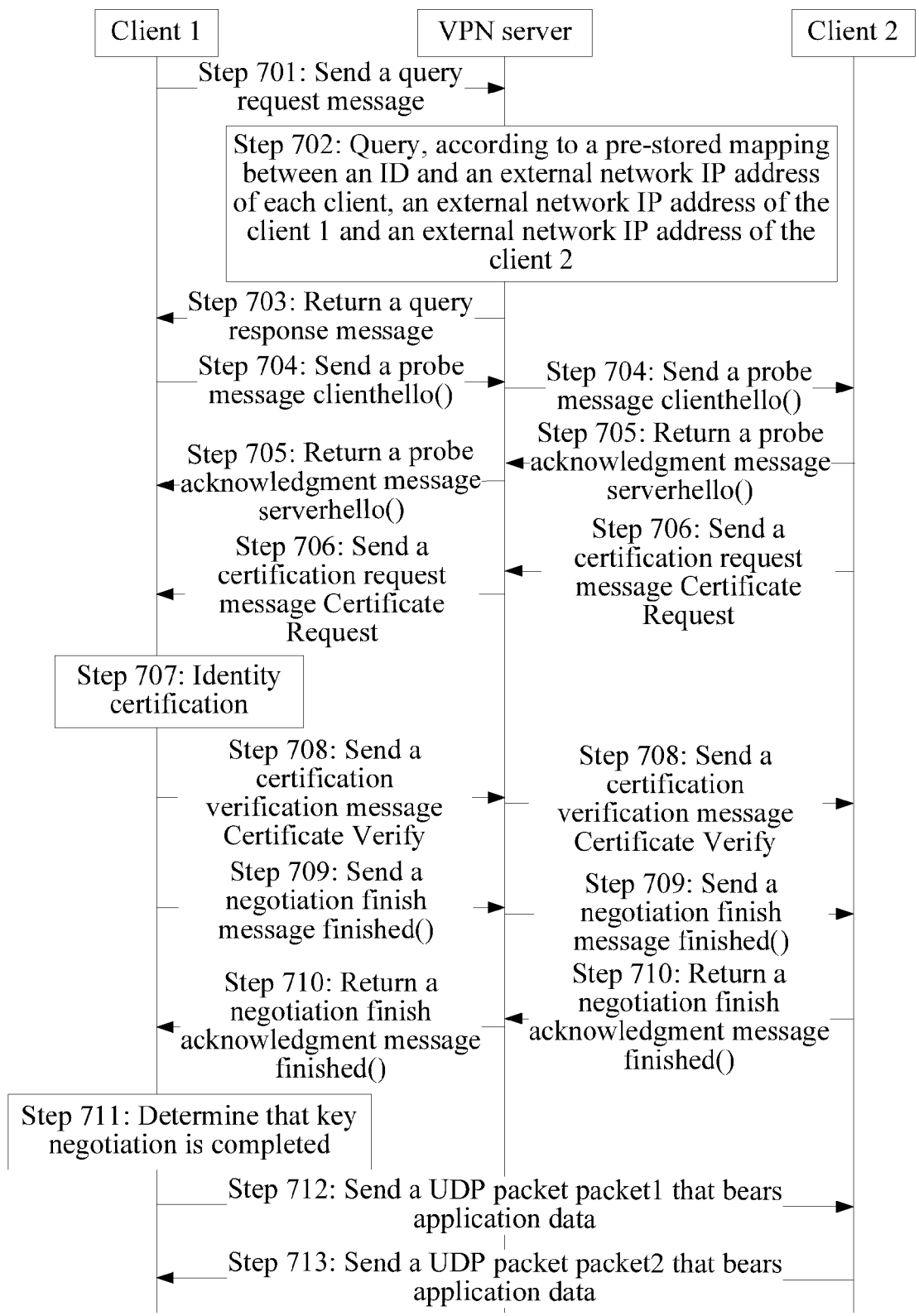
FIG. 7C is a sequence diagram of the data transmission process according to Embodiment 5 of the present invention.

FIG. 7C is a sequence diagram of the embodiment of the present invention, including the following steps.

Step 701: A client 1 sends a query request message to a VPN server, where the query request message carries an ID of the client 1 and an ID of a client 2.

The ID of the client 1 and the ID of the client 2 are allocated by the VPN server when the client 1 and the client 2 log in to the VPN server. The client 1 obtains the ID allocated by the VPN server to the client 1 from a login response message of the VPN server in advance, and obtains the ID of the client 2 by querying the VPN server in advance.

Step 702: The VPN server queries, according to a prestored correspondence between an ID and an external network IP address of each client, an external network IP address corresponding to the ID of the client 1 and an external network IP address corresponding to the ID of the client 2.

Optionally, the VPN server also stores a correspondence between an ID and an internal network IP address of each client, the VPN server may also query, according to the correspondence between the ID and the internal network IP address of each client, an internal network IP address of the client 1 and an internal network IP address of the client 2, and carries the internal network IP address of the client 1 and the internal network IP address of the client 2 together with the external network IP address corresponding to the ID of the client 1 and the external network IP address corresponding to the ID of the client 2 in a query response message, and sends the query response message to the client 1.

Step 703: The VPN server returns a query response message to the client 1, where the query response message carries the external network IP address of the client 1 and the external network IP address of the client 2.

Optionally, the query response message also includes the internal network IP address of the client 1 and the internal network IP address of the client 2.

Step 704: The client 1 sends a probe message clienthello( ) to the client 2 through the VPN server.

The probe message carries the internal network IP address of the client 1 and the internal network IP address of the client 2, and after receiving the probe message, the VPN server sends the probe message to the client 2.

In a whole key negotiation process, the client 1 and the client 2 exchange messages according to the internal network IP addresses.

Step 705: Optionally, after receiving the probe message clienthello( ), the client 2 returns a probe acknowledgment message serverhello( ) to the client 1 through the VPN server.

Step 706: The client 2 carries a public key of the client 2 in a certification request message Certificate Request, and sends the certification request message Certificate Request to the client 1 through the VPN server.

Step 707: The client 1 extracts the public key of the client 2 from the certification request message Certificate Request as a key obtained through the negotiation, and performs identity certification on the public key of the client 2 through a third-party certification server, and after the certification succeeds, the procedure proceeds to step 708.

Step 708: The client 1 sends a certification verification message Certificate Verify to the client 2 through the VPN server. The certification verification message Certificate Verify carries a public key of the client 1.

After receiving the certification verification message Certificate Verify, the client 2 may extract the public key of the client 1 from the message, where the public key is used to perform encryption processing on a UDP packet when the packet is sent to the client 1 subsequently.

Step 709: The client 1 sends a negotiation finish message finished( ) to the client 2 through the VPN server.

Step 710: After receiving the negotiation finish message finished( ), the client 2 returns a negotiation finish acknowledgment message finished( ) to the client 1 through the VPN server.

Step 711: After receiving the negotiation finish acknowledgment message finished( ), the client 1 determines that the key negotiation is completed. If the client 1 does not receive the probe acknowledgment message serverhello( ), the certification request message Certificate Request, or the negotiation finish acknowledgment message finished( ) in the key negotiation process, the client 1 determines that the key negotiation fails.

Step 712: The client 1 writes the external network IP address of the client 1 into a source address field of a to-be-sent UDP packet packet1, writes the external network IP address of the client 2 into a destination address field of the packet1, and encrypts the packet1 according to the public key of the client 2. The client 1 sends an encrypted packet1 to the client 2. A payload part of the packet1 bears application data that is to be sent by the client 1 to the client 2.

Step 713: The client 2 receives the packet1 sent by the client 1, decrypts the packet1 by using a private key of the client 2, and obtains the application data born in the payload part of the packet1. If the client 2 needs to return application data to the client 1, the client 2 extracts the external network IP address of the client 1 and the external network IP address of the client 2 from the received packet 1, writes the external network IP address of the client 2 into a source address field of a to-be-sent UDP packet packet2, writes the external network IP address of the client 1 into a destination address field of the packet2, and encrypts the packet2 by using the public key of the client 1, where a payload part of the packet2 bears the application data that is sent by the client 2 to the client 1, and the client 2 sends an encrypted packet2 to the client 1.

In the foregoing steps 701 to 703, a process of querying an external network IP address is completed, and in steps 704 to 711, a key negotiation process is completed. This embodiment is described by taking asymmetric key negotiation as an example; and symmetric key negotiation is relatively simple, where it is only required that a client notifies a peer end of a key that is generated by the client and receives an acknowledgment message from the peer end. It should be noted that, steps 704 to 711 provide only a message interaction procedure of the key negotiation, and persons skilled in the art may adjust message interaction order according to an actual requirement, delete some optional messages or add other messages. For example, after receiving the probe acknowledgment message, the client 1 may first carry the public key of the client 1 in the certification request message Certificate Request and send the certification request message Certificate Request to the client 2 through the VPN server, and the client 2 performs identify certification in the third-party certification server; or after receiving the probe message, the responding client does not need to return a probe acknowledgment message but directly sends a certification request message, that is, step 705 is omitted.

The packet interaction process in steps 712 to 713 may include interaction of more than two messages.

Embodiment 6

Figure 8:
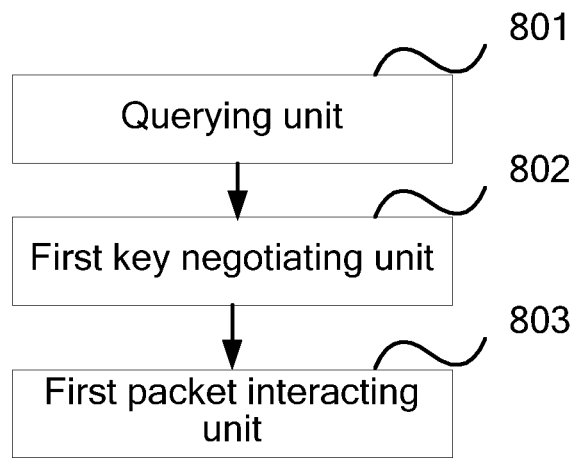
FIG. 8 is a schematic structural diagram of an initiating client device according to Embodiment 6 of the present invention.

Accordingly, an embodiment of the present invention further provides an initiating client device. As shown in FIG. 8, the apparatus includes a querying unit 801, a first key negotiating unit 802, and a first packet interacting unit 803.

The querying unit 801 is configured to query a VPN server for external network IP addresses of the initiating client and a responding client.

The first key negotiating unit 802 is configured to perform key negotiation with the responding client through the VPN server.

The first packet interacting unit 803 is configured to: after the key negotiation is completed, write the external network IP address of the initiating client into a source address field of a to-be-sent user datagram protocol UDP packet, write the external network IP address of the responding client into a destination address field of the to-be-sent user datagram protocol UDP packet, and encrypt the to-be-sent UDP packet according to a key obtained through the negotiation; and send an encrypted UDP packet to the responding client, and perform packet interaction with the responding client directly.

For a specific querying manner of the querying unit 801 and a working manner of the first key negotiating unit 802 in a specific key negotiation process, reference is made to the description in the foregoing method embodiments, which are not described herein again.

Figure 9:
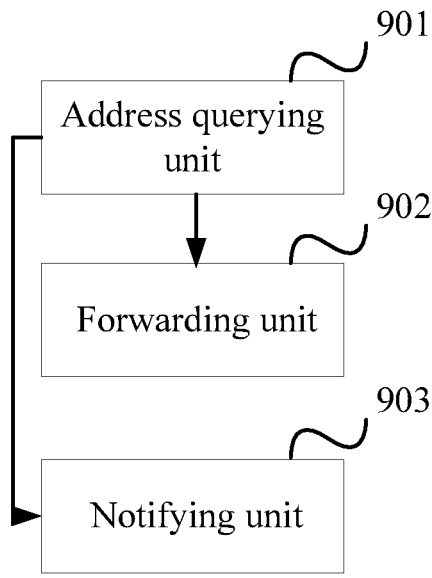
FIG. 9 is a schematic structural diagram of a VPN server according to Embodiment 6 of the present invention.

An embodiment of the present invention further provides a VPN server. As shown in FIG. 9, the VPN server includes an address querying unit 901 and a forwarding unit 902.

The address querying unit 901 is configured to provide queried external network IP addresses of an initiating client and a responding client for the initiating client according to a pre-stored external network IP address of each client.

The forwarding unit 902 is configured to: in a process of key negotiation preformed between the initiating client and the responding client, forward a message, sent by the initiating client, to the responding client and forward a message, returned by the responding client, to the initiating client.

Optionally, the VPN server further includes: a notifying unit 903 configured to send transmission information of the initiating client to the responding client after the address querying unit 901 provides the external network IP addresses for the initiating client, where the transmission information includes the external network IP address of the initiating client and the transmission information is used by the responding client to configure a network security policy, so as to allow the responding client to receive and process a packet from the initiating client.

Figure 10:
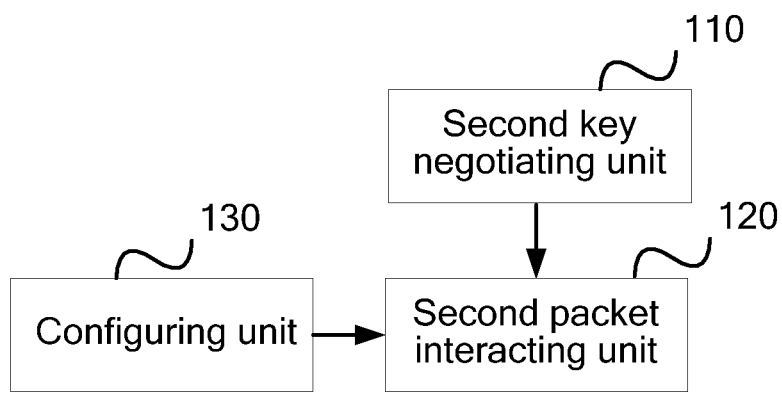
FIG. 10 is a schematic structural diagram of a responding client device according to Embodiment 6 of the present invention.

An embodiment of the present invention further provides a responding client device. As shown in FIG. 10, the responding client device includes a second key negotiating unit 110 and a second packet interacting unit 120.

The second key negotiating unit 110 is configured to perform key negotiation with an initiating client through a VPN server.

The second packet interacting unit 120 is configured to: after the key negotiation is completed, extract external network IP addresses of the initiating client and the responding client from a received UDP packet sent by the initiating client, write the external network IP address of the responding client into a source address field of a to-be-sent UDP packet, write the external network IP address of the initiating client into a destination address field of the to-be-sent UDP packet, and encrypt the to-be-sent UDP packet according to a key obtained through the negotiation; and send an encrypted UDP packet to the initiating client, and perform packet interaction with the initiating client directly.

Optionally, the responding client device further includes: a configuring unit 130 configured to: before the second packet interacting unit 120 performs packet interaction with the initiating client directly, receive transmission information of the initiating client sent by the VPN server, where the transmission information includes the external network IP address of the initiating client; and configure a network security policy according to the transmission information, so as to allow the responding client to receive and process a packet from the initiating client.

An embodiment of the present invention further provides a data transmission system, including the initiating client device shown in FIG. 8, the VPN server shown in FIG. 9, and the responding client device shown in FIG. 10. For working principles and mutual interaction procedures of the initiating client device, the VPN server, and the responding client device, reference is made to the foregoing method embodiments and descriptions about FIG. 8, FIG. 9, and FIG. 10, which are not described herein again.

Persons of ordinary skill in the art may understand that all or part of the steps of the methods in the foregoing embodiments may be implemented by a program instructing relevant hardware. The program may be stored in a computer readable storage medium, such as a read only memory (ROM)/random access memory (RAM), a magnetic disk, or an optical disk.

Persons skilled in the art may make modifications and variations without departing from the spirit and scope of the present invention. In this way, if these modifications and variations fall within the scope of the claims and equivalent technologies of the present invention, the present invention is also intended to include these modifications and variations.

What is claimed is:

1. A data transmission method implmented by an initiating client and applied in a virtual private network (VPN), comprising:
    querying a VPN server for external network Internet Protocol (IP) addresses of the initiating client and a responding client;
    performing key negotiation with the responding client through the VPN server;
    writing the external network IP address of the initiating client into a source address field of a user datagram protocol (UDP) packet after the key negotiation is completed, wherein the UDP packet is generated by the initiating client;
    writing the external network IP address of the responding client into a destination address field of the UDP packet;
    encrypting the UDP packet according to a key obtained through the key negotiation to obtain an encrypted UDP packet;
    sending, the encrypted UDP packet to the responding client; and
    performing packet interaction with the responding client directly,
    wherein performing the key negotiation with the responding client through the VPN server comprises:
        sending a probe message to the responding client through the VPN server;
        receiving a certification request message that is sent from the responding client and that is forwarded by the VPN server, wherein the certification request message is sent by the responding client after the probe message is received, and wherein the certification request message carries a public key of the responding client;
        extracting the public key of the responding client from the certification request message as the key obtained through on the key negotiation;
        performing identity certification on the public key of the responding client through a third-party certification server;
        sending a certification verification message to the responding client through the VPN server after the certification succeeds, wherein the certification verification message carries a public key of the initiating client;
        sending a negotiation finish message to the responding client through the VAN server;
        determining that the key negotiation is completed after receiving a negotiation finish acknowledgment message that is from the responding client and is forwarded by the VPN server; and
        determining that the key negotiation fails when the initiating client does not receive the certification verification message or the key negotiation finish acknowledgment message.

2. The method according to claim 1, wherein querying the VPN server for the external network IP address of the initiating client and the responding client comprises:
    sending, a query request message to the VPN server, wherein the query request message carries an identifier of the initiating client and an identifier of the responding client, wherein the identifier of the initiating client is allocated when the initiating client logs in to the VPN server, and wherein the identifier of the responding client is allocated when the responding client logs in to the VPN server;
    receiving, a query response message returned by the VPN server; and
    extracting the external network IP address of the initiating client and the external network IP address of the responding client from the query response message.

3. The method according to claim 1, wherein after sending the encrypted UDP packet to the responding client, the method further comprises:
    receiving, a UDP packet that is sent by the responding client and encrypted according to the public key of the initiating client; and
    decrypting a received UDP packet according to a private key of the initiating client.

4. The method according to claim 2, wherein after sending the encrypted UDP packet to the responding client, the method further comprises:
    receiving, by the initiating client, a UDP packet that is sent by the responding client and encrypted according to the public key of the initiating client; and decrypting, by the initiating client, a received UDP packet according to a private key of the initiating client.

5. An initiating client device applied in a virtual private network (VPN), comprising a processor and a memory storing instructions that when executed by the processor cause the initiating client device to:
 query a VPN server for external network Internet Protocol (IP) addresses of the initiating client device and a responding client device;
 perform key negotiation with the responding client device through the VPN server;
 write the external network IP address of the initiating client device into a source address field of a user datagram protocol (UDP) packet after the key negotiation is completed, wherein the UDP packet is generated by the initiating client:
 write the external network IP address of the responding client device into a destination address field of the UDP packet;
 encrypt the to packet according to a key obtained through the key negotiation to obtain an encrypted UDP packet; and
 send the encrypted UDP packet to the responding client device, and perform packet interaction with the responding client device directly,
 wherein performing the key negotiation with the responding client device through the VPN server comprises:
  sending a probe message to the responding client device through the VPN server;
  receiving a certification request message that is sent from the responding client device and that is forwarded by the VPN server, wherein the certification request message is sent by the responding client device after the probe message is received, and wherein the certification request message carries a public key of the responding client device:
  extracting the public key of the responding client device from the certification request message as the key obtained through the key negotiation;
  performing identity certification on the public key of the responding client device through a third-party certification server;
  sending a certification verification message to the responding client device through the VPN server after the certification succeeds, wherein certification verification message carries a public key of the initiating client device;
  sending a negotiation finish message to the responding client device through the VPN server;
  determining that the key negotiation is completed after receiving a negotiation finish acknowledgment message that is from the responding client device and is forwarded by the VPN server; and
  determining that the key negotiation fails when the initiating client device does not receive the certification verification message or the key negotiation finish acknowledgment message.

6. The initiating client device according to claim 5, wherein the instructions, when executed by the processor, further cause the initiating client device to:
 send a query request message to the VPN server, wherein the query request message carries an identifier of the initiating client device and an identifier of the responding client device, wherein the identifier of the initiating client device is allocated when the initiating client device logs in to the VPN server, and wherein the identifier of the responding client device is allocated when the responding client device logs in to the VPN server;
 receive a query response message returned by the VPN server; and
 extract the external network IP address of the initiating client device and the external network IP address of the responding client device from the query response message.

7. The initiating client device according to claim 5, wherein the instructions, when executed by the processor, further cause the initiating client device to:
 receive a UDP packet that is sent by the responding client device and encrypted according to the public key of the initiating client device; and
 decrypt a received UDP packet according to a private key of the initiating client device.

8. A data transmission system, applied in a virtual private network (VPN), comprising:
 an initiating client device;
 an VPN server; and
 a responding client device,
 wherein the initiating client device is configured to:
  query the VPN server for external network Internet Protocol (IP) addresses of the initiating client device and the responding client device;
  perform key negotiation with the responding client device through the VPN server;
  write the external network IP address of the initiating client device into a source address field of a user datagram protocol (UDP) packet which is generated by the initiating client device after the key negotiation is completed;
  write the external network IP address of the responding client device into a destination address field of the UDP packet;
  encrypt the UDP packet according to a key obtained through the key negotiation to obtain a first encrypted UDP packet; and
  send the first encrypted UDP packet to the responding client device; and
  perform packet interaction with the responding client device directly,
 wherein performing the key negotiation with the responding client device through the VPN server comprises:
  sending a probe message to the responding client device through the VPN server;
  receiving a certification request message that is sent from the responding client device and that is forwarded by the VPN server, wherein the certification request message is sent by the responding client device after the probe message is received, and wherein the certification request message carries a public key of the responding client device;
  extracting the public key of the responding client device from the certification request message as the key obtained through the key negotiation;
  performing identity certification on the public key of the responding client device through a third-party certification server;
  sending a certification verification message to the responding client device through the VPN server after the certification succeeds, wherein the certification verification message carries a public key of the initiating client device;
  sending a negotiation finish message to the responding client device through the VPN server;

determining that the key negotiation is completed after receiving a negotiation finish acknowledgment message that is from the responding client device and is forwarded by the VPN server; and determining that the key negotiation fails when the initiating client device does not receive the certification verification message or the key negotiation finish acknowledgment message, wherein the VPN server is configured to:
provide queried external network IP addresses of the initiating client device and the responding client device for the initiating client device according to a pre-stored external network IP address of each client device;

forward a message sent by the initiating client device to the responding client device during a process of key negotiation preformed between the initiating client device and the responding client device; and forward a message returned by the responding client device to the initiating client device, and wherein the responding client device is configured to:
perform key negotiation with the initiating client device through the VPN server;

extract external network IP addresses of the initiating client device and the responding client device from a received UDP packet sent by the initiating client device after the key negotiation is completed;

write the external network IP address of the responding client into a source address field of a UDP packet generated by the responding client device;

write the external network IP address of the initiating client into a destination address field of the UDP packet generated by the responding client device;

encrypt the UDP packet generated by the responding client device according to a key obtained through the key negotiation to obtain a second encrypted UDP packet; and send the second encrypted UDP packet to the initiating client device, and perform packet interaction with the initiating client device directly.

* * * * *